United States Patent
Hengartner et al.

(10) Patent No.: US 10,796,258 B1
(45) Date of Patent: Oct. 6, 2020

(54) DECORRELATING EFFECTS IN MULTIPLE LINEAR REGRESSION TO DECOMPOSE AND ATTRIBUTE RISK TO COMMON AND PROPER EFFECTS

(71) Applicant: Triad National Security, LLC, Los Alamos, NM (US)

(72) Inventors: Nicolas Hengartner, Los Alamos, NM (US); Leticia Cuellar-Hengartner, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 234 days.

(21) Appl. No.: 16/103,452

(22) Filed: Aug. 14, 2018

Related U.S. Application Data

(60) Provisional application No. 62/545,915, filed on Aug. 15, 2017.

(51) Int. Cl.
| | | |
|---|---|---|
| *G06Q 30/00* | (2012.01) | |
| *G06Q 10/06* | (2012.01) | |
| *G06Q 40/06* | (2012.01) | |
| *G06N 7/00* | (2006.01) | |
| *G06F 17/16* | (2006.01) | |
| *G06F 17/18* | (2006.01) | |
| *G06F 17/15* | (2006.01) | |

(52) U.S. Cl.
CPC ......... *G06Q 10/0635* (2013.01); *G06F 17/15* (2013.01); *G06F 17/16* (2013.01); *G06F 17/18* (2013.01); *G06N 7/00* (2013.01); *G06Q 10/067* (2013.01); *G06Q 40/06* (2013.01)

(58) Field of Classification Search
CPC .......... G06F 17/15; G06F 17/16; G06F 17/18; G06Q 10/0635; G06Q 30/00; G06Q 10/067; G06Q 40/06; G06N 7/00
See application file for complete search history.

(56) References Cited

U.S. PATENT DOCUMENTS

| | | | | |
|---|---|---|---|---|
| 6,163,366 A | * | 12/2000 | Okamoto | ............ G03F 7/70458 355/53 |
| 2016/0055395 A1 | * | 2/2016 | Macciola | ................ G06T 5/006 382/190 |

OTHER PUBLICATIONS

Klein, Analysis of Systematic Risk: Decomposition and Portfolio Efficiency Klein, 2011, Theses, Dissertations, and Problem Reports. 3459. (Year: 2011).*

(Continued)

*Primary Examiner* — Patricia H Munson
*Assistant Examiner* — Uche Byrd
(74) *Attorney, Agent, or Firm* — LeonardPatel P.C.; Michael Aristo Leonard, II; Sheetal Suresh Patel

(57) ABSTRACT

Effects in multiple linear regression may be decorrelated to decompose and attribute risk to common and proper effects. In other words, an attribute risk may be decomposed to two or more causes, where each cause is characterized by multiple attributes. The risk decomposition may decompose risk into a first residual part associated with a first set of risk factors, a second residual part associated with a second set of risk factors, and a common part associated with a set of common hidden variables that minimize a correlation between the first set of factors and the second set of factors. The common hidden variables may be modeled using a hidden factor model. An effect of the correlation may be minimized on the first set of risk factors and the second set of risk factors, and how correlated the terms of the risk decomposition are may be quantified.

17 Claims, 6 Drawing Sheets

(56) References Cited

OTHER PUBLICATIONS

E.F. Fama and K.R. French, "Common Risk Factors in the Returns on Stocks and Bonds," J. Financ. Econ., vol. 33, No. 1, pp. 3-56 (1993).

Rudolf F. Klein and Victor K. Chow, "Orthogonalized Equity Risk Premia and Systematic Risk Decomposition," Working Papers from Department of Economics, West Virginia University, No. 10-05 (2010).

Rudolf F. Klein and Victor K. Chow, "Orthogonalized Factors and Systematic Risk Decomposition," The Quarterly Review of Economics and Finance, vol. 53, No. 2, pp. 175-187 (2013).

* cited by examiner

DECORRELATING EFFECTS IN MULTIPLE LINEAR REGRESSION TO DECOMPOSE AND ATTRIBUTE RISK TO COMMON AND PROPER EFFECTS

CROSS-REFERENCE TO RELATED APPLICATION

This application claims the benefit of U.S. Provisional Patent Application No. 62/545,915 filed Aug. 15, 2017. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to decorrelating effects, and more particularly, to decorrelating effects in multiple linear regression by identifying latent subspaces to decompose and attribute risk to common and proper effects.

BACKGROUND

Consider the following example in which one seeks to decompose and attribute risk. An audit performed by an accounting firm can either be good or bad. Failure here means that the audit does not contain all of the required elements. A quality review of the audit will reveal whether it is good or bad. Of interest is to decompose the risk of an audit failure, as measured by the log-odds (i.e., the logarithm of the odds) of the probability of failure estimated from a logistic regression on historical data into a client risk and an execution risk. In practice, these two sources of risk are dependent since the execution of an audit depends on the perceived risk of the client. That is, the covariates used to predict execution risk are correlated to the covariates used to predict client risk. As a result, the predicted execution and client risks are also correlated, making their interpretation challenging. The approach described here is very general, but the principle is demonstrated in this example.

The problem with risk decomposition, and risk attribution, is that the set of explanatory variables are correlated. This make it difficult to quantify how changes in one of the explanatory variable alone impact the risk, because changes in that variable imply changes in the correlated variables. While that problem is recognized in the literature on risk decomposition, it is not well addressed. For instance, statistical techniques that un-correlate the variables, such as principal component, are not satisfactory as interpretability is lost.

To account for correlations, risk decomposition and attribution is conventionally performed using orthogonalization and explicit modeling. Using orthogonalization, risk decomposition in terms of variance decomposition is readily achieved if all the variables are orthogonal. When they are not, the variables are often transformed into an orthogonal basis using, for example, a single value decomposition. This allows separation of the various effects. However, because the orthogonalization is obtained by taking linear combinations of the variables, the ability to interpret the results in terms of the original variables is lost.

Using explicit modeling, it is possible to guess what common factors may be driving the observed covariates. Measuring these factors allows to estimate and separate the risks. However, this approach requires prior knowledge regarding which factors are relevant, which may not always be known or readily measurable.

In the context of understanding financial risk, Fama and French propose a regression model to attribute financial risk to various asset classes. See E. F. Fama and K. R. French, "Common Risk Factors in the Returns on Stocks and Bonds," J. Financ. Econ., vol. 33, no. 1, pp. 3-56 (1993). Alternatively, Klein and Chow proposed to use factor analysis techniques to orthogonalize the entire design matrix of risk factors. See Rudolf F. Klein and Victor K. Chow, "Orthogonalized Equity Risk Premia and Systematic Risk Decomposition," Working Papers from Department of Economics, West Virginia University, no. 10-05 (2010); see also Rudolf F. Klein and Victor K. Chow, "Orthogonalized Factors and Systematic Risk Decomposition," The Quarterly Review of Economics and Finance, vol. 53, no. 2, pp. 175-187 (2013).

While this solves the problem of correlated observations mathematically, the ability to interpret the components is lost. Furthermore, the design matrix cannot be transformed so that the covariates associated with the execution and the covariates associated with the client are orthogonal. Indeed, no three-way decomposition is provided by previous approaches. Accordingly, an improved approach to decomposition may be beneficial.

SUMMARY

Certain embodiments of the present invention may provide solutions to the problems and needs in the art that have not yet been fully identified, appreciated, or solved by conventional decorrelation solutions. For example, some embodiments pertain to decorrelating effects in multiple linear regression to decompose and attribute risk to common and proper effects. Due to the importance of being able to interpret and communicate the results, a new methodology has been developed by Los Alamos National Laboratory to decompose risk in a manner that leads to interpretable risk decomposition in the presence of correlated explanatory variables.

In an embodiment, a computer program is embodied on a non-transitory computer-readable storage medium. The program is configured to cause at least one processor to determine residual matrices $R_1$ and $R_2$ that include a first residual part and a second residual part for a first set of risk factors and a second set of risk factors, respectively. When $R_1'R_2=0$, the program is configured to cause the at least one processor to perform a three-way risk decomposition enforcing orthogonality of the first residual part and the second residual part that also decomposes risk into a common part associated with a set of common hidden variables common to $R_1$ and $R_2$ that minimize a correlation between the first set of risk factors and the second set of risk factors. The common hidden variables are modeled using a hidden factor model. When $R_1'R_2 \neq 0$, the program is configured to cause the at least one processor to employ a generalized risk decomposition approach without enforcing orthogonality of the first residual part and the second residual part. The program is also configured to cause the at least one processor to quantify how correlated the terms of the risk decomposition are and output the quantification.

In another embodiment, a computer-implemented method includes determining, by a computing system, residual matrices $R_1$ and $R_2$ that include a first residual part and a second residual part for a first set of risk factors and a second set of risk factors, respectively. The computer-implemented method also includes performing a three-way risk decomposition, by the computing system, enforcing orthogonality of the first residual part and the second residual part that also decomposes risk into a common part associated with a set of common hidden variables common to $R_1$ and $R_2$ that minimize a correlation between the first set of risk factors and the second set of risk factors. The common hidden variables are modeled using a hidden factor model. The computer-implemented method further includes quantifying, by the computing system, how correlated the terms of the risk decomposition are and outputting the quantification.

In yet another embodiment, a computer-implemented method includes determining, by a computing system, residual matrices $R_1$ and $R_2$ that include a first residual part and a second residual part for a first set of risk factors and a second set of risk factors, respectively. The computer-implemented method also includes employing a generalized risk decomposition approach, by the computing system, without enforcing orthogonality of the first residual part and the second residual part. The computer-implemented method further includes quantifying, by the computing system, how correlated the terms of the risk decomposition are and outputting the quantification.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
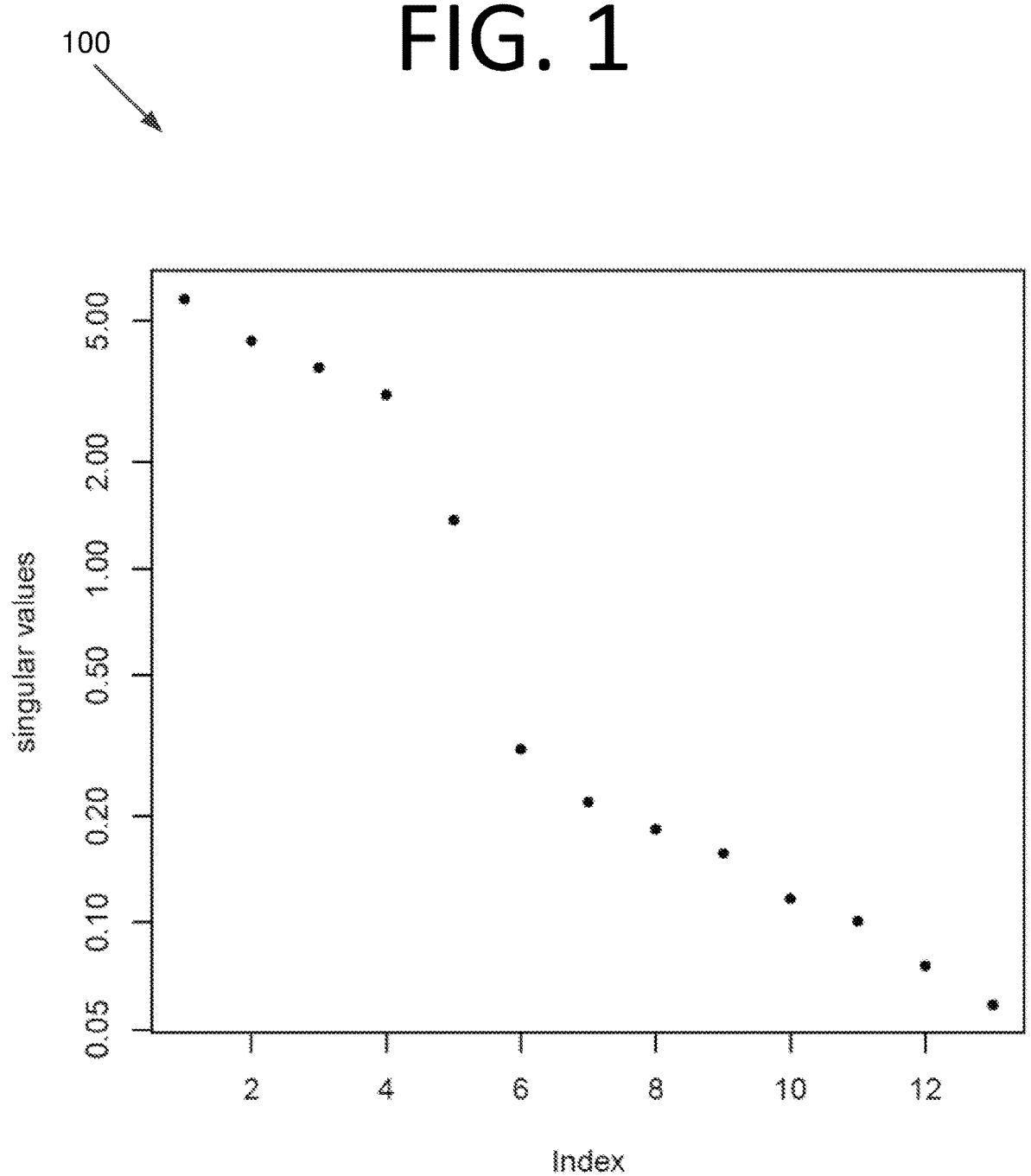
FIG. 1 is a graph plotting the singular values of each index of the projection of the columns of $X_1$ onto the columns of $X_2$ for an example where the model holds only approximately, according to an embodiment of the present invention.

Some embodiments of the present invention pertain to decorrelating effects in multiple linear regression to decompose and attribute risk to common and proper effects. In other words, some embodiments may decompose and attribute risk to two or more causes, where each cause is characterized by multiple attributes. As an example, consider the case of decomposing and attributing the risk of cancer to environmental and genetic causes, where both environmental and genetic causes are characterized using multiple measurements. The decomposition and attribution to these two causes is made challenging by the possibility that both causes may share common, but unknown, factors. For example, isolated populations can share exposure to some environmental factors and partially share genomic makeup. Nave risk decomposition that does not take into account the impact of such shared factors will lead to wrong conclusions.

In order to find common, unknown factors (i.e., hidden factors), an initial approach that was explored assumed that there exists a small set of common latent (hidden) variables that could explain the entire correlation between the explanatory variables. That assumption made it possible to operate the decomposition using a relatively simple algorithm. Unfortunately, as was discovered in working out an example using real data, this assumption does not necessarily hold for real datasets. Applying this algorithm when the assumption fails results in a risk decomposition with correlated terms. In other words, this did not resolve the problem sought to be resolved—namely, decomposing risk in a manner that leads to interpretable risk decomposition in the presence of correlated explanatory variables.

Thus, a better approach was found. While in real datasets, it may not always be possible to explain all of the correlations between the explanatory variables with hidden factors, one can seek to control the amount of unexplained correlation that remains in the data after accounting for common hidden variables. The problem then becomes identifying a set of latent variables that minimize the correlation between the terms of the risk decomposition. Thus, while not completely solving the correlation issue between terms of the risk decomposition, one is now able to minimize the effect of correlation in the original set of explanatory variables and quantify how correlated the terms of the risk decomposition are.

The risk decomposition and attribution approach of some embodiments seeks to decompose the risk into three (and not two) components. It should be emphasized that while the approach of some embodiments produces a risk associated to the common factors, the end user does not need to specify, or even know, what the common factors are. The approach of some embodiments can be applied to many areas of applications, and can be generalized to decompose and attribute risk to multiple causes. Consider the following two examples: (1) Consider the problem of quantifying the risk of project failure. For project management purposes, it is helpful to decompose the total risk of project failure into a project risk (measuring the complexity, scope and size of the project) and an execution risk (measuring the staffing of a team and how it performs throughout the duration of the project). A benefit of such a decomposition is that while project risk is exogenous, execution risk can be controlled. Since the staffing, and possibly the execution, depends on the perceived complexity of the project, it is reasonable to assume that there are hidden common factors between the covariates explaining project risk and execution risks. (2) Consider medical outcomes research, in which researchers attempt to explain negative patient outcome to multiple causes: (i) patient adherence to the treatment regime; (ii) determination of the appropriate treatment/diagnosis from doctors; and (iii) institutional failures. In this example, there are three categories of risks. The approach explained herein with respect to some embodiments can be extended to three or more cases in other embodiments. When there are three categories, the total risk is decomposed into seven groups instead of three. More generally, with k groups, the risk is decomposed into 2k–1 groups. Understanding the various modes of failure and their relative importance can help better allocate resources. For example, medical institutions may use this risk decomposition to determine which is the better investment to improve diabetes outcomes: (1) invest in counseling and mental health care to improve treatment adherence; or (2) hire more healthcare workers to decrease the time between visitations.

A novel approach to risk attribution employed by such embodiments may blend some aspects from applying linear regression techniques to effect orthogonalization. More specifically, given two types of explanatory variables used to predict outcome, their correlation may be modeled using a hidden factor model, also called latent variables. In other words, it is assumed that unseen variables exist that impact both sets of variables to fully explain their dependence (i.e., correlation). This leads to a risk decomposition into three parts rather than two: the common part associated to the hidden factors, and the two residual parts associated to each of the two sets of explanatory variables (e.g., environmental factors and genetic factors, as discussed above). This differs from conventional risk decomposition techniques. A benefit of this approach is that under the common factor assumption, the three parts are orthogonal to each other. This leads to a more meaningful risk decomposition that preserves the interpretability of the results, which is more advantageous. Indeed, both the three-way decomposition and the technical strategy of common factor modeling of some embodiments are novel. Concrete, computer-based data structures may be created that correspond to representations of vector spaces of unobserved latent variables. These unobserved latent variables can be represented as two matrices A and B whose inner-product $A^T B=0$. In some embodiments, more than two matrices may be used.

Methodology

To describe the methodology of some embodiments, consider the previous example of decomposing project failure into a "project risk" and an "execution risk." Project failure is a binary outcome variable. As is common, logistic regression can be used to relate the logarithm of the odds ratio of the probability that the project fails to collections of explanatory (or exogenous) variables. That relationship can be estimated from historical data. The aim of the risk decomposition is to decompose that relationship into interpretable components associated to project characteristics and execution characteristics. Thus, the risk (i.e., the log-odds ratio of the failure probability) can be expressed as a linear combination of two types of explanatory variables a first type of variables that measure project attributes (e.g., $X_{1,1}, X_{1,2}, \ldots, X_{1,p}$) and a second type of variables that measure attributes of the execution of the project ($X_{2,1}, X_{2,2}, \ldots, X_{2,q}$), namely:

$$\text{risk} = \log\left(\frac{\theta}{1-\theta}\right) = c_{1,1}X_{1,1} + c_{1,2}X_{1,2} + \ldots + c_{1,p}X_{1,p} + c_{2,1}X_{2,1} + c_{2,2}X_{2,2} + \ldots + c_{2,q}X_{2,q} \quad (1)$$

where $\theta$ is the conditional failure probability given the set of exogenous variables and the constants $c_{i,j}$ are the regression coefficients. In principle, the project risk could be defined as $c_{1,1}X_{1,1}+c_{1,2}X_{1,2}+\ldots+c_{1,p}X_{1,p}$ and the execution risk could be defined as $c_{2,1}X_{2,1}+c_{2,2}X_{2,2}+\ldots+c_{2,q}X_{2,q}$. However, these two quantities are dependent since the execution on a project depends on the perceived complexity of that project. That is, the covariates used to predict execution risk are correlated to the covariates used to predict project risk. As a result, the predicted execution and project risks are also correlated, making their interpretation challenging.

To elaborate further on this point, it is known that if the explanatory variables have been standardized to have a mean of zero and a standard deviation of one, the magnitudes of the regression coefficients in the logistic equation are directly comparable. Thus, a ranking of the absolute value of these coefficients provides a ranking of the relative importance of the corresponding variables to explain the resulting risk. Note that "relative importance" is mentioned here. If the explanatory variables would, in fact, be independent, the ranking provides an absolute ranking of the variables. However, when the variables are correlated, a large coefficient for a particular variable may be just a consequence of the model trying to compensate for a large coefficient of a variable with which the original variable is negatively correlated.

As a consequence, Eq. (1) can provide a good forecasting model for audit failure, but in most cases (when variables are correlated), it doesn't provide a clean method for risk attribution. Thus, to obtain a transparent model of risk attribution (i.e., a model that clearly identifies causes of risk), a methodology is needed that allows decomposition of the risk of a failed audit into three uncorrelated components: one component that accounts for the commonality between the two sets of variables (the ones that measure the client risk and those that measure the execution risk in this example), and two residual components associated to each of the two sets of variables.

This decomposition can be generalized to three (or more) sets of covariates, corresponding to three (or more) risk categories. When doing so, $2^{k-1}-1$ sets of hidden common factors are identified (one set for each combination of two or more categories) and k residual factors. For such a decomposition to hold, each category needs to have at least $2^{k-1}$ linearly independent variables. Rewriting Eq. (1) in matrix form, the following equation results:

$$\text{risk} = \log\left(\frac{\theta}{1-\theta}\right) = X_1 C_1 + X_2 C_2 \quad (2)$$

The aim is to express this risk as the sum of the independent components:

$$\text{risk} = \log\left(\frac{\theta}{1-\theta}\right) = [f(X_1)C_1 + f(X_2)C_2] + g(X_1)C_1 + h(X_2)C_2 \quad (3)$$

where f, g, and h are functions that need to be defined/constructed such that each of the terms $[f(X_1)C_1+f(X_2)C_2]$, $g(X_1)C_1$, and $h(X_2)C_2$ are uncorrelated. In the methodology of some embodiments, the first term is viewed as the risk explained by the common hidden variables and the second and third terms are viewed as the residual (or proper) risk of client and execution risks. This methodology is novel in both the fields of risk analysis and statistics.

The initial effort to develop such a methodology allowed decomposition of the risk into three components, except that after starting to apply the methodology to concrete examples, it was discovered that the components that account for the individual risks (namely, $g(X_1)$ and $h(X_2)$) were not necessarily uncorrelated. It was later learned why this happened. The initial methodology exploited the fact that the entire correlation between the explanatory variables for client and execution risks can be explained by a set of hidden variables. This assumption does not need to hold. When it fails, correlated residual risks result.

The subsequent research effort concentrated in modifying the methodology so that if those two components are in fact correlated, components can be chosen that are "as uncorrelated as possible." An exact definition to quantitatively measure the concept of "as uncorrelated as possible" is not provided herein. This new construction allows quantitatively evaluating the quality of the approximation and controlling (in fact, minimizing) the correlation between the residual risks. Finally, the methodology was tested with synthetic data in both cases when the two components $g(X_1)$ and $h(X_2)$ are in fact uncorrelated and when they are only approximately uncorrelated.

Examples with Synthetic Data

The following examples use synthetic data to show an application of the risk decomposition methodology and its algorithmic implementation using statistical analysis software.

Example 1—When the Model Holds

It is first shown how the method works in a simulated example in which 30 explanatory variables are divided into a first set of 17 variables and a second set of 13 variables. In this example, there are 5 hidden factors. In this first example, it is assumed that the shared hidden factor model holds. Specifically, the inner products are zero (up to machine precision).

max(abs(t(R1) %*% R2))
    [1] 2.072995e-16
    max(abs(t(R1) %*% FF))
    [1] 3.060432 e-16
    max(abs(t(R2) %*% FF))
    [1] 3.597654e-16

In this case, it is known that the fitted values from a regression of the columns of $X_1$ onto the columns of $X_2$ should have dimension 5. This can be seen by performing a singular value decomposition of the matrix of fitted values and observing that there are only 5 non-zero singular values.

>ffit←lm(X1~X2)
    >FX1←fitted(ffit)
    >svd.X1←svd(FX1)
    >round(svd.X1$d,5)
    [1] 4.93514 3.89629 3.33186 2.68366 2.05003 0.00000 0.00000 0.00000 0.00000 0.00000 0.00000 0.00000
    >F1←svd.X1$u[,1:5]

The eigenvectors associated to these singular values form an orthonormal basis $F_1$ for the linear span of the columns of the hidden factors. Doing the regression from the columns of $X_2$ onto the columns of $X_1$ provides an alternative way to find an orthonormal basis $F_2$ for that subspace. It can be verified that the columns span the same subspace by doing a singular value decomposition (SVD) of $F_1^T F_2$, and then checking that all of the singular values are non-zero.

>ffit←lm(X1~X2)
    >FX2←fitted(ffit)
    >svd.X2←svd(FX2)
    >round(svd.X2$d,5) [1] 5.16695 3.93399 3.41600 2.97166 2.03673 0.00000 0.00000 0.00000 0.00000
    [10] 0.00000 0.00000 0.00000 0.00000 0.00000 0.00000 0.00000 0.00000
    >F2←svd.X2$u[,1:5]
    ># verify that the eigenvectors span the same space
    >PP←t(F1) %*% F2
    >svd.p←svd(PP)
    >round(svd.p$d,5)
    [1] 0.94886 0.92499 0.91088 0.86310 0.83553

Example 2—When the Model Holds Only Approximately

The case is now considered where for residual matrices $R_1$ and $R_2$, $R_1^T R_2$ is not equal to zero. Here, the same setup as in Example 1 is considered, but without enforcing the orthogonality of the residuals.

>C1←FF %*% matrix(rnorm(kk*p1),kk,p1)
    >C2←FF %*% matrix(rnorm(kk*p2),kk,p2)
    # signal to noise
    >mean(abs(C1))/mean(abs(rR1))
    [1] 2.283409
    >X1←C1+rR1
    >X2←C2+rR2
    >max(abs(t(rR1) %*% rR2))
    [1] 0.1587561
    >max(abs(t(rR1) %*% FF))
    [1] 1.584392e-16
    >max(abs(t(rR2) %*% FF))
    [1] 3.532873e-16

In this case, it is known that the projection method fails. This can be verified empirically by observing that the singular values of the projection of the columns of $X_1$ onto the columns of $X_2$ are non-zero.

>ffit←lm(X1~X2)
    >FX1←fitted(ffit)
    >svd.X1←svd(FX1)
    >round(svd.X1$d,5)
    [1] 5.76009 4.39153 3.67931 3.08810 1.37093 0.30944 0.21938 0.18408 0.15696
    [10] 0.11688 0.10107 0.07569 0.05872
    >plot(svd.X1$d, pch=20, ylab="singular values", log="y")

See graph 100 of FIG. 1. Next, the spectrum of W is calculated.

>P1←X1%*% solve(t(X1) %*% X1) %*% t(X1)
    >P2←X2%*% solve(t(X2) %*% X2) %*% t(X2)
    >svd.p1←eigen(P1)
    >U←svd.p1 $vectors[, svd.p1 $values>0.5]
    >W←t(U) %*% P@ %*% U
    >svd.w←eigen(W)
    >plot(svd.w$values, pch=20, ylab="eigenvalues", log="y",sub="eigenvalues of W")

Figure 2:
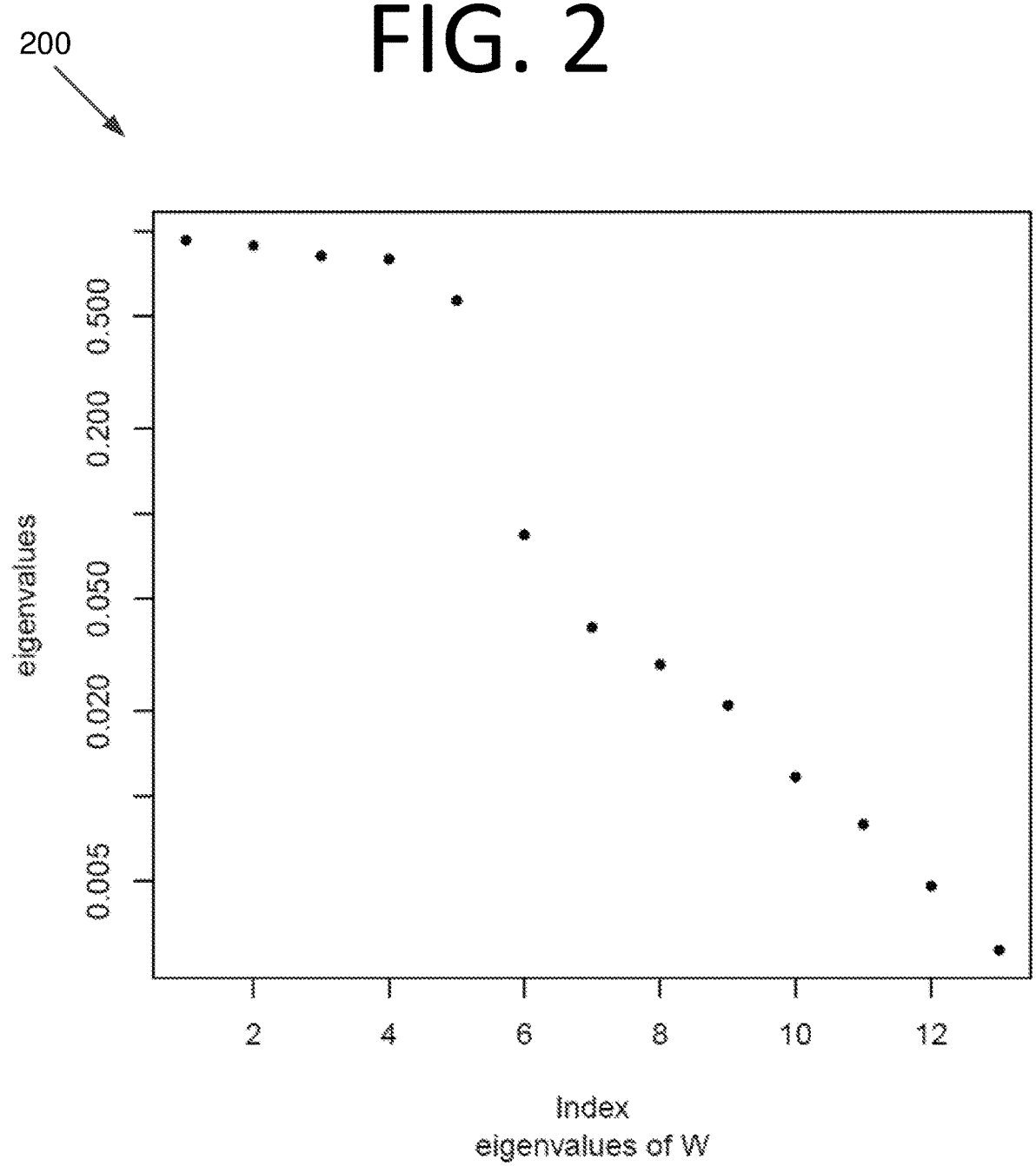
FIG. 2 is a graph plotting the eigenvalues of W for each index, according to an embodiment of the present invention.

See graph 200 of FIG. 2. Note that the shapes of the two spectra in graphs 100 and 200 are similar, although the magnitudes of the values are not.

The plot of FIG. 2 shows a clear break in the eigenvalues. It can be determined how much the recovered subspace overlaps with the true subspace as a function of the number of basis functions. The measure of agreement is the sum of the norm of the projection of the true basis functions onto the estimated common space.

```
>vv←rep(0,13)
>for (kin 1:13){
+V←U %*% svd.w$vectors[,1:k]
+Z←V %*% t(V) %*% FF
+vv[k]←sum(apply(Z, 2, FUN=function(x) sum(x^2)))
+}
>plot(vv[1:13], pch=20, ylab="variance explained",
    xlab="dimension of common factor space",
+sub="Variance of true subspace explained")
```

Figure 3:
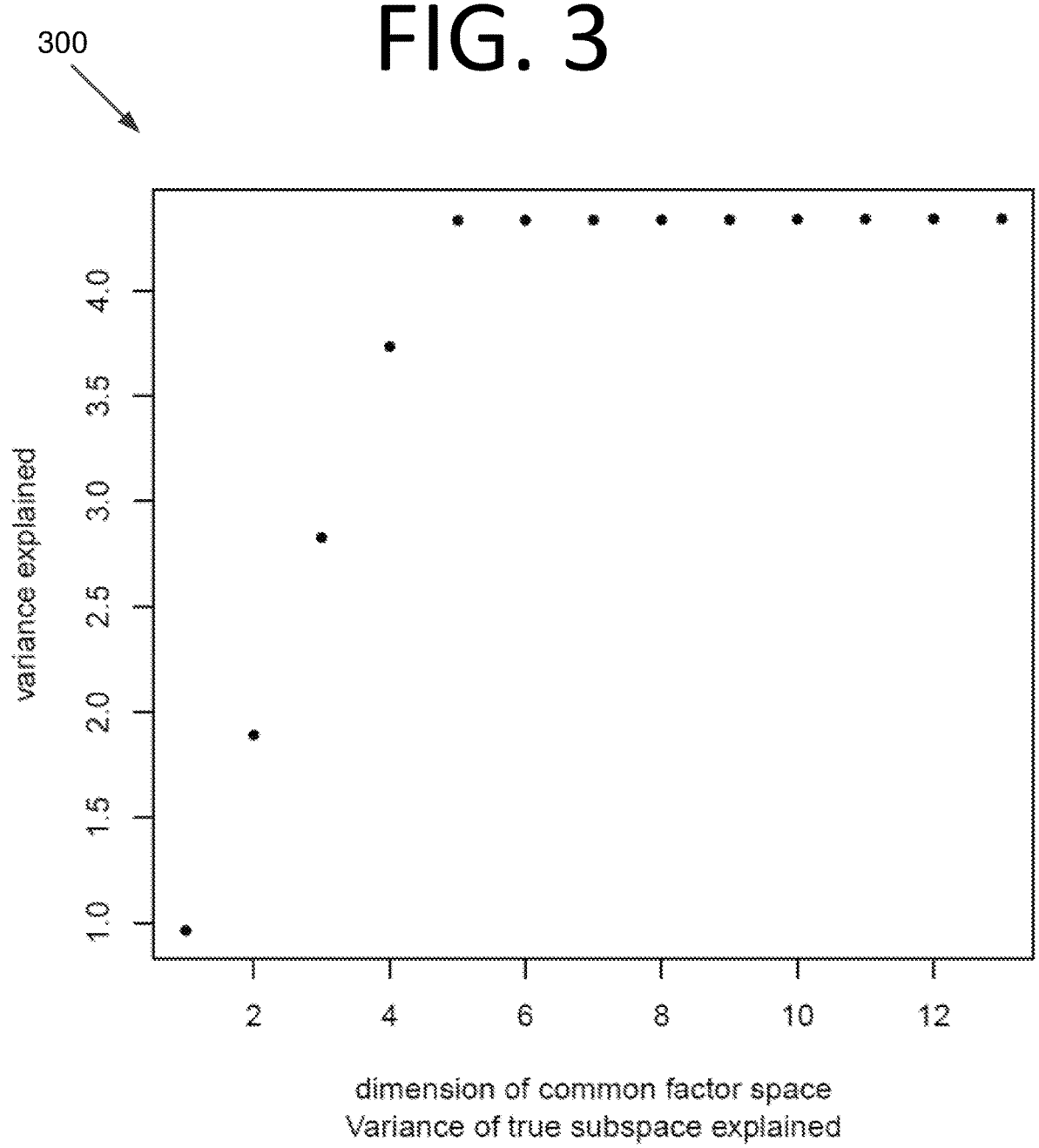
FIG. 3 is a graph plotting explained variance for dimensions of the common factor space, explaining the variance of the true subspace, according to an embodiment of the present invention.

See graph 300 of FIG. 3. Graph 300 shows that the hidden factor vector space is not fully recovered. It also hints at a way to detect the correct dimension for the common hidden factor space by looking for a plateau in the explained variance.

While the above example is unrealizable in practice since F is not known, the same idea can be applied to quantify how much of $X_2$ is explained by the subspace. In this simulated example, an encouraging result is realized.

```
>vv←rep(0,13)
>for (k in 1:13){
+V←U %*% svd.w$vectors[,1:k]
+Z←V %*% t(V) %*% X2
+vv[k]←sum(apply(Z, 2, FUN=function(x) sum(x^2)))
+}
>plot(vv[1:13],pch=20, ylab="variance explained",
    xlab="dimension of common factor space",
+sub="Variance of X2 explained")
```

Figure 4:
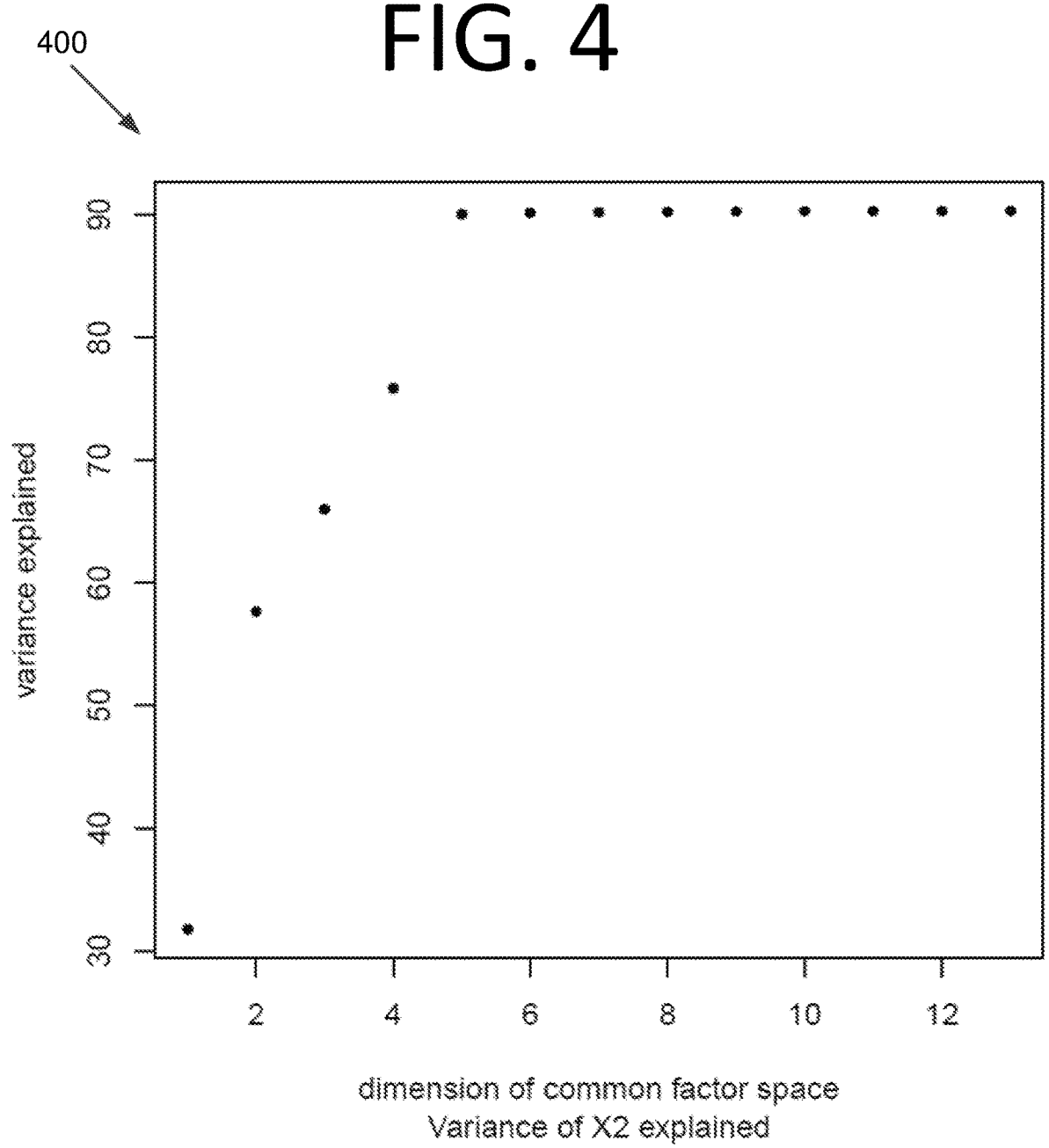
FIG. 4 is a graph plotting explained variance for dimensions of the common factor space, explaining the variance of $X_2$, according to an embodiment of the present invention.

See graph 400 of FIG. 4. From graph 400, it can be concluded that five hidden variables are likely. The reason is that increasing the dimension beyond five does not increase the total variance explained. Looking at the eigenvalues, it can be seen that the inner product can be bounded between unit vectors in the two residual spaces by $\sqrt{0.066}\approx0.26$. A larger subspace of dimension 11 can reduce that inner product to $\sqrt{0.007}\approx0.08$.

What can be Learned from Identifying the Hidden Common Factor Space

From identifying the hidden common factor space, it can be learned that the fraction of each variable contributes to the shared common factors. Assume that the first five eigenvectors $E=[u_1, u_2, \ldots, u_5]$ of W are used to define the orthonormal basis $V=UE$ for the shared common factor space. Then, for each column $X_1=[x_{1,1}, x_{1,2}, \ldots, x_{1,13}]$ and $X_2=[x_{2,1}, x_{2,2}, \ldots, x_{2,17}]$, the following ratio can be calculated:

$$v_{i,j} = \sum_{k=1}^{5} (v_k^t x_{i,j})^2 / \|x_{i,j}\|^2 \quad (4)$$

[1]  0.8838385   0.8448763   0.8399380  0.8540171 0.9384843 0.9014337 0.9364313
[8]  0.8500906   0.9615197   0.9717519   0.8218843  0.7869230 0.8722810
[1]  0.5596873   0.6000764   0.6748673   0.8390038  0.8579301 0.5600665 0.7472104
[8]  0.7731442   0.7427858   0.7539134   0.5097984  0.5679547 0.7424178 0.6109090
[15] 0.7361943 0.6077457 0.6716946

This allows one to identify which variables are strongly contributing to the hidden factors, possibly helping one to gain some insight about what these factors might be. With respect to the potential usefulness of the risk attribution model of some embodiments, several questions may be answered with the methodology. Two formulations of the model of the shared hidden factor model the mathematical foundation that justified the algorithm of some embodiments when the model assumptions hold exactly, and extension of the methodology to cases when the model holds approximately—are discussed in further detail below.

Model and Assumptions

Let X denote the n×p design matrix of p measured covariates on n individuals. These covariates are of two types. Grouping the covariates of each type, two matrices $X_1$ and $X_2$ are obtained of dimensions n×$p_1$ and n×$p_2$, respectively, with $p_1+p_2=p$. The matrix $X_1$ contains the variables of type 1, and the matrix $X_2$ contains the variables of type 2. Here, it is assumed that both $p_1, p_2 \geq 2$.

Common Factor Model

To effect the three-way decomposition of the risk of some embodiments, it is postulated that there exists a set of k unobserved factors that are common and linearly impact both types of measurements, thereby driving the dependency between the two types of variables. Specifically, let F denote the n×k matrix of unobserved factors (i.e., the common factor matrix) and model the two design matrices $X_1$ and $X_2$ as:

$$X_1 = FA_1 + R_1 \quad (5)$$

$$X_2 = FA_2 + R_2 \quad (6)$$

where $A_1$ and $A_2$ are the k×$p_1$ and k×$p_2$ loading matrices, and $R_1$ and $R_2$ are the residual matrices of dimension n×$p_1$ and n×$p_2$, respectively. Since the common factor matrix F is not observed, it cannot be uniquely identified. As will be seen, the linear subspace spanned by the columns of F can nonetheless be recovered. Without loss of generality, it is assumed that the columns of F are an orthonormal, such that $F^tF=I_k$. The following additional assumptions are made on $R_1$ and $R_2$:

$$F^tR_1 = 0 \quad (7)$$

$$F^tR_2 = 0 \quad (8)$$

$$R_1^tR_2 = 0 \quad (9)$$

Note that for any orthonormal matrix F, it is always possible to express the design matrixes $X_1$ and $X_2$ as in Eq. (5) and (6), respectively, with the conditions of Eq. (7) and (8) holding. Indeed, it suffices to take:

$$A_1 = F^tX_1, R_1 = X_1 - FA_1, A_2 = F^tX_2, R_2 = X_2 - FA_2$$

However, for an arbitrary matrix F, the condition of Eq. (9) is likely to fail. That is, the assumption of Eq. (9) is what makes recovery of the linear subspace of the common hidden factors, when the model holds. Indeed, for arbitrary design matrices $X_1$ and $X_2$, the condition of Eq. (9) may not hold for any matrix F.

Orthogonal Decomposition Model Reformulation

To assist in developing an approximate orthogonal risk decomposition when Eq. (9) does not hold, it is useful to reformulate the common factor model into one that focuses on the orthogonal decomposition of the design matrices $X_1$ and $X_2$ by focusing on modeling the residuals matrices $R_1$ and $R_2$. In that sense, this formulation is dual to the model presented above.

From the assumptions of Eq. (7) and (8), it is known that the rank of $R_1$ and $R_2$ is $p_1-k$ and $p_2-k$, respectively. This means it is possible to express:

$$R_1 = G_1B_1 \quad (10)$$

$$R_2 = G_2B_2 \quad (11)$$

where $G_1$ and $G_2$ are $n \times (p_1-k)$ and $n \times (p_2-k)$ matrices, respectively, and $B_1$ and $B_2$ are $(p_1-k) \times p_1$ and $(p_2-k) \times p_2$ matrices, respectively. Furthermore, let $C_1 = FA_1$ and $C_2 = FA_2$. Using this notation, Eq. (5) and (6) can be rewritten, respectively, as:

$$X_1 = C_1 + G_1 B_1 \qquad (12)$$

$$X_2 = C_2 + G_2 B_2 \qquad (13)$$

The constraints in Eq. (7), (8), and (9) imply the following set of constraints on $G_1$ and $G_2$:

$$G_1^t C_1 = 0 \qquad (14)$$

$$G_2^t C_2 = 0 \qquad (15)$$

$$G_1^t G_2 = 0 \qquad (16)$$

$$G_1^t C_2 = 0 \qquad (17)$$

$$G_2^t C_1 = 0 \qquad (18)$$

The discussion above regarding the identifiability of F applies here as well to the matrices $G_1$ and $G_2$. Specifically, while the matrices $G_1$ and $G_2$ are not unique, the subspaces spanned by their columns are unique. Thus, without loss of generality, it is assumed that the columns of $G_1$ and $G_2$ are orthonormal.

The decomposition of Eq. (12) and (13) and the assumptions of Eq. (14)-(18) were based on the model and associated assumptions set forth above. The next proposition shows that the model described here is equivalent to the shared factor model in that, starting from these assumptions, the common factor model introduced above is recovered.

Proposition 1: Suppose that the design matrices $X_1$ and $X_2$ can be decomposed as in Eq. (12) and (13), respectively. If the ranks of $G_1$ and $G_2$ are maximal while satisfying the constraints of Eq. (14)-(18), then the columns of $C_1$ and $C_2$ span the same linear space. That is, $$C_1 = FA_1, C_2 = FA_2$$

Proof: Denote by $\mathbb{G}_1$, $\mathbb{G}_2$, $\mathbb{C}_1$, $\mathbb{C}_2$ the linear spaces spanned by the columns of $G_1$, $G_2$, $C_1$, $C_2$, respectively. The assumptions of Eq. (14)-(18) imply that $\mathbb{G}_1$ is orthogonal to $\mathbb{G}_2$, $\mathbb{C}_1$, and $\mathbb{C}_2$, and furthermore, $\mathbb{G}_2$ is orthogonal to $\mathbb{C}_1$ and $\mathbb{C}_2$.

Suppose that the linear space $\mathbb{C}_1 \setminus \mathbb{C}_2$ is not empty. Then, an orthonormal basis of the linear space $\mathbb{C}_1 \setminus \mathbb{C}_2$ can be added to the matrix $G_1$ to produce a matrix $\tilde{G}_1$, and the matrix $\tilde{C}_1 = X_1 - \tilde{G}_1 \tilde{G}_1^t X_1$ can be set. It is straightforward to verify that the matrices $\tilde{G}_1$, $G_2$, $\tilde{C}_1$, $C_2$ satisfy the assumptions of Eq. (14)-(18). In addition, that construct increases the rank of $G_1$ by the dimension of $\mathbb{C}_1 \setminus \mathbb{C}_2$. A similar construction holds when $\mathbb{C}_1 \setminus \mathbb{C}_2$ is non-empty.

Finally, $G_1$ and $G_2$ are of maximal rank when both $\mathbb{C}_1 \setminus \mathbb{C}_2$ and $\mathbb{C}_2 \setminus \mathbb{C}_1$ are empty sets, which proves the proposition.

Estimation Under Model Assumptions

Assume that a decomposition of the design matrices $X_1$ and $X_2$ exists that satisfies the conditions of Eq. (7)-(9). The next theorem characterizes the linear span $\mathbb{F}$ of the columns of the common factor matrix F in terms of projections. The characterization will be used to justify algorithms to uncover the linear vector space $\mathbb{F}$.

Theorem 1: Assume that $X_1$ and $X_2$ can be decomposed in Eq. (5) and (6), with the assumptions of Eq. (7)-(9) holding. Denote by $\mathbb{X}_1$, $\mathbb{X}_2$, and $\mathbb{F}$ the linear spaces generated by the columns of $X_1$, $X_2$, and F, respectively. Let $\mathcal{P}_1$ and $\mathcal{P}_2$ denote the projection onto $\mathbb{X}_1$ and $\mathbb{X}_2$, respectively. Then $$\{\mathcal{P}_1(x_2) : x_2 \in \mathbb{X}_2\} = \mathbb{F} \qquad (19)$$

$$\{\mathcal{P}_2(x_1) : x_1 \in \mathbb{X}_1\} = \mathbb{F} \qquad (20)$$

Proof: By Eq. (7), any vector $v_1 \in \mathbb{X}_1$ can be rewritten as $v_1 = f_1 + r_1$, where $f_1 \in \mathbb{F}$ and $r_1^t h = 0$. Similarly, from Eq. (8), $v_2 \in \mathbb{X}_2$, $v_2 = f_2 + r_2$ with $f_2 \in \mathbb{F}$. Finally, from Eq. (9), $r_1^t r_2 = 0$.

Now consider the projection of any vector $v_2 \in \mathbb{X}_2$ onto $\mathbb{X}_1$. That projection is the solution to the optimization problem $$\min_{v_1 \in \mathbb{X}_1} \|v_2 - v_1\|^2 =$$

$$\min_{v_1 \in \mathbb{X}_1} \|f_2 + r_2 - f_1 - r_1\|^2 = \min_{v_1 \in \mathbb{X}_1} \|f_2 - f_1\|^2 + \|r_2\|^2 + \|r_1\|^2$$

where the orthogonality is used to obtain the last equivalence. That minimum is achieved by taking $f_1 = f_2$ and $r_2 = 0$, which implies that $\mathcal{P}_1(v_2) \in \mathbb{F}$. The latter implies that for $v_2 \in \mathbb{X}_2$, $\mathcal{P}_1(v_2) = \mathcal{P}_1$, the projection onto the linear subspace $\mathbb{F}$. Denote the columns of $X_2$ by $[x_1, \ldots, x_q]$, where q is the number of columns in $X_2$. By Eq. (6) and (8), it can be concluded that $\{\mathcal{P} \mathbb{F}(x_1), \ldots, \mathcal{P} \mathbb{F}(x_q)\}$ has rank k, and hence $\{\mathcal{P}_1(v_2) : v_2 \in \mathbb{X}_2\} = \mathbb{F}$.

Following Theorem 1, an orthonormal basis for the span of $\mathbb{F}$ can be computed by projecting the columns of $X_1$ onto $X_2$, and then identifying an orthonormal base for these projections. Algorithmically, this may be achieved as follows:

Algorithm A:
(1) Use linear regression on each column of $X_1$ onto $X_2$.
(2) Aggregate the fitted values from each of these regressions into a matrix $\hat{C}_1$.
(3) Use Singular Value Decomposition (SVD) on $\hat{C}_1$ to express $\hat{C}_1 = U \wedge V^t$. U is an n times $p_1$ matrix whose columns are orthonormal, V is a $p_1$ times $p_1$ matrix whose column are orthonormal, and $\wedge$ is the diagonal matrix whose elements are the singular values.
(4) Identify the index I of the non-zero singular values.
(5) Set $F = [U_j : j \in I]$.
(6) Finally, calculate the other elements in the hidden common factor decomposition by operating:

$$A_1 = F^t X_1$$

$$A_2 = F^t X_2$$

$$R_1 = X_1 - FF^t X_1$$

$$R_2 = X_2 - FF^t X_2$$

The next corollary provides an alternative approach to find an orthonormal basis for $\mathbb{F}$ by calculating right (or left) eigenvectors of the matrix $$W = (X_1^t X_1)^{-1} X_1^t X_2 (X_2^t X_2)^{-1} X_2^t \qquad (21)$$

Corollary 1: Under the conditions of Theorem 1, the subspace $\mathbb{F}$ is spanned by the right or left eigenvectors associated to nonzero singular values of matrix W.

Proof: From Theorem 1, $\mathbb{F} = \{\mathcal{P}_1(x_2) : x_2 \in \mathbb{X}_2\}$. Using the fact that $\mathcal{P}_1(x_2) = X_1 (X_1^t X_1)^{-1} X_1^t$ and $\mathbb{X}_2 = X_2 (X_2^t X_2)^{-1} X_2^t X$, for any $x \in \mathbb{R}^n$ it follows that the set of $x \in \mathbb{R}^n$ for which $$X_1 (X_1^t X_1)^{-1} X_1^t X_2 (X_2^t X_2)^{-1} X_2^t x = \lambda x \qquad (22)$$

with $\lambda \neq 0$ forms a basis for $\mathbb{F}$. This proves the right eigenvector claim. Interchanging the role of $X_1$ and $X_2$ proves the left eigenvector claim.

Algorithm B:
(1) Calculate the matrix $W = X_1 (X_1^t X_1)^{-1} X_1^t X_2 (X_2^t X_2)^{-1} X_2^t$ (2) Calculate the set of right eigenvectors and eigenvalues satisfying $Wq_j = \lambda_j q_1$.
(3) Identify the index I of the non-zero singular values.
(4) Set $F = \{q_j : j \in I\}$.
(5) Finally, calculate the other elements in the hidden common factor decomposition by operating:

$$A_1 = F^t X_1$$

$$A_2 = F^t X_2$$

$$R_1 = X_1 - FF^t X_1$$

$$R_2 = X_2 - FF^t X_2$$

Finally, it may be useful to discuss how the dual characterization of $\mathbb{F}$ can be used to estimate an orthonormal basis $G_1$ and $G_2$ for $\mathbb{R}_1$ and $\mathbb{R}_2$, respectively. These two matrices can then be used to find an orthonormal basis for $\mathbb{F}$.

Corollary 2: Denote by $\mathbb{R}_2$ the linear space spanned by the columns of $R_2$. Then under the assumptions of Theorem 1, $$\{v - \mathcal{F}_1(v) : v \in \mathbb{X}_2\} = \mathbb{R}_2 \quad (23)$$

This corollary leads to the following (dual) algorithm.
Algorithm C:
(1) Use multiple linear regression to regress each column of $X_1$ onto $X_2$.
(2) Aggregate the vector of residuals from these regressions into a matrix $\hat{R}_1$.
(3) Use SVD to express $\hat{R}_1 = U \wedge V^t$.
(4) Identify $I_1$ as the set of indices for which the singular values $\lambda_i$ are non-zero.
(5) Set $G_1 = [U_j : j \in I_1]$.
(6) Use multiple linear regression to regress each column of $X_2$ onto $X_1$.
(7) Aggregate the vector of residuals from these regressions into a matrix $\hat{R}_2$.
(8) Use SVD to express $\hat{R}_2 = U \wedge V^t$.
(9) Identify $I_2$ as the set of indices for which the singular values $\lambda_i$ are non-zero.
(10) Set $G_2 = [U_j : j \in I_2]$.
(11) Calculate $C_1 = X_1 - G_1 G_1^t X_1$.
(12) Use SVD to express $C_1 = U \wedge V^t$.
(13) Identify $I_F$ as the set of indices for which the singular values $\lambda_i$ are non-zero.
(14) Set $F = [U_j : j \in I_F]$.
(15) Set $A_1 = F^t X_1$, $A_2 = F^t X_2$, $B_1 = G_1^t X_1$, $B_2 = G_2^t X_2$ Generalization In practice, the assumption of Eq. (9) may not hold exactly. Nevertheless, it may still be desirable to craft an approximate risk decomposition. Before proceeding, it should be made clear what is meant by approximate orthogonal decomposition. Recall that two linear spaces $\mathbb{V}_1$ and $\mathbb{V}_2$ are orthogonal if $$\sup_{v_1 \in \mathbb{V}_1, v_2 \in \mathbb{V}_2} \langle v_1 | v_2 \rangle = 0$$

Two vector spaces are $\varepsilon$-near orthogonal if $$\sup_{v_1 \in \mathbb{V}_1, v_2 \in \mathbb{V}_2} \frac{\langle v_1 | v_2 \rangle}{\|v_1\| \|v_2\|} \leq \varepsilon \quad (24)$$

Geometrically, the ratio $\langle v_1 | v_2 \rangle / (\|v_1\| \|v_2\|)$ is the cosine of the angle between $v_1$ and $v_2$. The next proposition provides a useful alternative expression for Eq. (24).

Proposition 2: Given two linear vector spaces $\mathbb{V}_1$ and $\mathbb{V}_2$, $$\sup_{v_1 \in \mathbb{V}_1, v_2 \in \mathbb{V}_2} \left( \frac{\langle v_1 | v_2 \rangle}{\|v_1\| \|v_2\|} \right)^2 = \sup_{v_2 \in \mathbb{V}_2} \frac{\|\mathcal{P}_{v_1}(v_2)\|^2}{\|v_2\|^2} = \sup_{v_1 \in \mathbb{V}_1} \frac{\|\mathcal{P}_{v_2}(v_1)\|^2}{\|v_1\|^2} \quad (25)$$

where $\mathcal{P}_{v_1}(v_2)$ and $\mathcal{P}_v(v_1)$ denote the projection of $v_2$ onto the linear space $\mathbb{V}_1$ and the projection of $v_1$ onto the linear space $\mathbb{V}_2$, respectively.

Proof: Fix $v_1 \in \mathbb{V}_1$, which without loss of generality, is assumed to have a length of one (i.e., $\|v_1\| = 1$). The squared cosine between that vector $v_1$ and $v_2 \in \mathbb{V}_2$ is the ratio $$\left( \frac{\langle v_1 | v_2 \rangle}{\|v_1\| \|v_2\|} \right)^2 = \frac{\|\mathcal{P}_{v_1}(v_2)\|^2}{\|v_2\|^2}$$

where $\mathcal{P}_{v_1}(v_2)$ denotes the projection of $v_2$ onto the vector of length one $v_1$. From the Pythagorean Theorem, $$\|v_2\|^2 = \|\mathcal{P}_{v_1}(v_2)\|^2 + \|v_2 - \mathcal{P}_{v_1}(v_2)\|^2$$

which leads to the deduction that for fixed $v_2$, $$\sup_{v_1 \in \mathbb{V}_1, \|v_1\|=1} \left( \frac{\langle v_1 | v_2 \rangle}{\|v_1\| \|v_2\|} \right)^2 = \sup_{v_1 \in \mathbb{V}_1, \|v_1\|=1} \frac{\|\mathcal{P}_{v_1}(v_2)\|^2}{\|v_2\|^2} \quad (26)$$

$$= \sup_{v_1 \in \mathbb{V}_1, \|v_1\|=1} \frac{\|v_2\|^2 - \|v_2 - \mathcal{P}_{v_1}(v_2)\|^2}{\|v_2\|^2} \quad (27)$$

$$= \frac{\|v_2\|^2 - \inf_{v_1 \in \mathbb{V}_1, \|v_1\|=1} \|v_2 - \mathcal{P}_{v_1}(v_2)\|^2}{\|v_2\|^2} \quad (28)$$

$$= \frac{\|\mathcal{P}_{v_1}(v_2)\|^2}{\|v_2\|^2} \quad (29)$$

where $\mathcal{P}_{v_1}(v_2)$ denotes the projection of $v_2$ onto $\mathbb{V}_1$. The conclusion follows by taking the supremum over $v_2$.

Some embodiments propose to decompose the risk by using the dual characterization of the shared factor model to identify $\varepsilon$-near orthogonal residual vector spaces $\mathbb{G}_1 \subset \mathbb{X}_1$ and $\mathbb{G}_2 \subset \mathbb{X}_2$, with which to construction the decomposition in Eq. (12) and (13). Specifically, define the subset $$\mathbb{H}_1 = \left\{ x \in \mathbb{X}_1 : \frac{\|\mathcal{P}_{\mathbb{X}_2}(x)\|^2}{\|x\|^2} \leq \varepsilon^2 \right\} \quad (30)$$

$$\mathbb{H}_2 = \left\{ x \in \mathbb{X}_2 : \frac{\|\mathcal{P}_{\mathbb{X}_1}(x)\|^2}{\|x\|^2} \leq \varepsilon^2 \right\} \quad (31)$$

Note that the sets $\mathbb{H}_1$ and $\mathbb{H}_2$ are not linear subspaces. However, it is straightforward to prove that
(1) if $y \in \mathbb{H}_1$, then $cy \in \mathbb{H}_1$ for $c \in \mathbb{R}$; and
(2) given $y_1, y_2 \in \mathbb{H}_1$ with $\langle y_1 | y_2 \rangle > 0$, then for all $\alpha \in [0, 1]$, the vector $\alpha y_1 + (1 - \alpha) y_2 \in \mathbb{H}_1$.

$$|\langle v_1 | v_2 \rangle| \leq \varepsilon \|v_1\| \|v_2\|$$

That is, $\mathbb{H}_1$ is a double convex cone. $\mathbb{G}_1 \subset \mathbb{H}_1$ is defined to be the largest linear subspace contained in $\mathbb{H}_1$. Similarly, $\mathbb{G}_2$ is the largest linear subspace contained in $\mathbb{H}_1$. By construction, for any pairs of vectors $v_1 \in \mathbb{G}_1$ and $v_2 \in \mathbb{G}_2$, $$|\langle v_1 | v_2 \rangle| \leq \varepsilon \|v_1\| \|v_2\|$$

In particular, if $G_1$ and $G_2$ are an orthogonal basis for $\mathbb{G}_1$ and $\mathbb{G}_2$, respectively, then $$\max_{ij}|(G_1^t G_2)_{ij}| \leq \varepsilon \quad (5)$$

The next theorem characterizes the subspace $\mathbb{G}_1$

Theorem 2: Denote by $P_1=X_1(X_1{'}X_1)^{-1}X_1{'}$ and $P_2=X_2(X_2{'}X_2)^{-1}X_2{'}$ the projection matrices onto $\mathbb{X}_1$ and $\mathbb{X}_2$, respectively. Consider the eigen decomposition of $P_1$:

$$P_1 = U\Lambda V^t$$

and let $U_*=[U_i:\lambda_i=1]$, the matrix of eigenvectors associated to the nonzero eigenvalues of $P_1$. Let $\lambda_1 \geq \lambda_2 \geq \ldots \geq \lambda_{p_1}$ be the eigenvalues of the matrix $U_*'P_2U_*$, and denote their associated eigenvectors $w_1 \geq w_2 \geq \ldots \geq w_{p_1}$. Then $\mathbb{G}_1$ is spanned by the orthonormal basis $\{U_*w_j:\lambda_j \leq \varepsilon^2\}$.

Note that: (1) the matrix $U_*$ is simply an orthonormal basis for $\mathbb{X}_1$, and can be computed using the Gram-Schmidt algorithm on $X_1$; and (2) the matrix $Z=U_*'P_2U_*$ has the same spectrum as the matrix $W$ identified in Corollary 1.

Proof: For all $x \in \mathbb{R}^n$, $\|x\|^2 \geq \|P_1x\|^2$, and for $x \in \mathbb{X}_1$, $\|x\|_2 \geq \|\mathcal{F}_1(x)\|^2$, so that $$\mathbb{H}_1 \subset \left\{x : \frac{\|P_2x\|^2}{\|P_1x\|^2}\right\} \leq \varepsilon^2 \quad (32)$$

Solving the extended eigenvalue problem implied by the generalized Rayleigh quotient $$\mathcal{R}(x) = \frac{\|P_2x\|^2}{\|P_1x\|^2} \quad (33)$$

Yields an orthonormal basis $q_1, q_2, \ldots, q_n$ and associated eigenvalues $\lambda_1 \geq \lambda_2 \geq \ldots \geq \lambda_n$ such that $$P_2q_j = \lambda_j P_1 q_j \quad (34)$$

By definition, the linear subspace is $$\{q_j : \lambda_j < \varepsilon^2\} \cap \mathbb{X}_1 = \mathbb{G}_1$$

which is the largest linear space contained in $\mathbb{H}_1$.
Now characterize the latter linear subspace. Consider the eigen decomposition $P_1 = U \Lambda U^t$, set $U_* = [U_i:\lambda_i=1]$, and define $x = U_*y$. It can be seen that $\|P_1x\|^2 = x'P_1x = y'U_*'U\Lambda U^t U_*y = y'y$ and $\|P_2x\|^2 = y'U_*'P_2U_*y$. Thus, $$\frac{\|P_2x\|^2}{\|P_1x\|^2} = \frac{y'U_*'P_2U_*y}{\|y\|^2}$$

Viewing the latter as a standard Rayleigh ratio, the eigenvalues $\lambda_1 \geq \lambda_2 \geq \ldots \geq \lambda_{p_1}$ and associated eigenvectors $w_1 \geq w_2 \geq \ldots \geq w_{p_1}$ of the matrix $U_{*hu\,t}P_2U_*$ should then be evaluated. Define $q_j = U_*w_j \in \mathbb{X}_1$, which completes the proof.

The following algorithm may be used to estimate E-near orthogonal risk decomposition:

Algorithm D
(1) Set $0<E<1$ to a small value (e.g., $10^{-3}$).
(2) Perform an eigen decomposition of the projection matrices $P_1=X_1(X_1{'}X_1)^{-1}X_1{'}$ and $P_2=X_2(X_2{'}X_2)^{-1}X_2{'}$ to identify an orthonormal basis $U_{1*}$ and $U_{2*}$ for $\mathbb{X}_1$ and $\mathbb{X}_2$, the linear span of the columns of the design matrices $X_1$ and $X_2$, respectively.
(3) Perform an eigen decomposition of $Z_1=U_{1*}'P_2U_{1*}$ and $Z_2=U_{2*}'P_1U_{2*}$.
(4) Set $I_1$ and $I_2$ to the indices of the eigenvalues of $Z_1$ and $Z_2$, respectively, that are less than $\varepsilon^2$.
(5) Set $Q_1=\{U_{1*}w_{1j}: j \in I_1\}$, $Q_2=\{U_{2*}w_{2j}: j \in I_2\}$.
(6) Compute $C_1=X_1-Q_1Q_1{'}X_1$ and $C_2=X_2-Q_2Q_2{'}X_2$.

Figure 5:
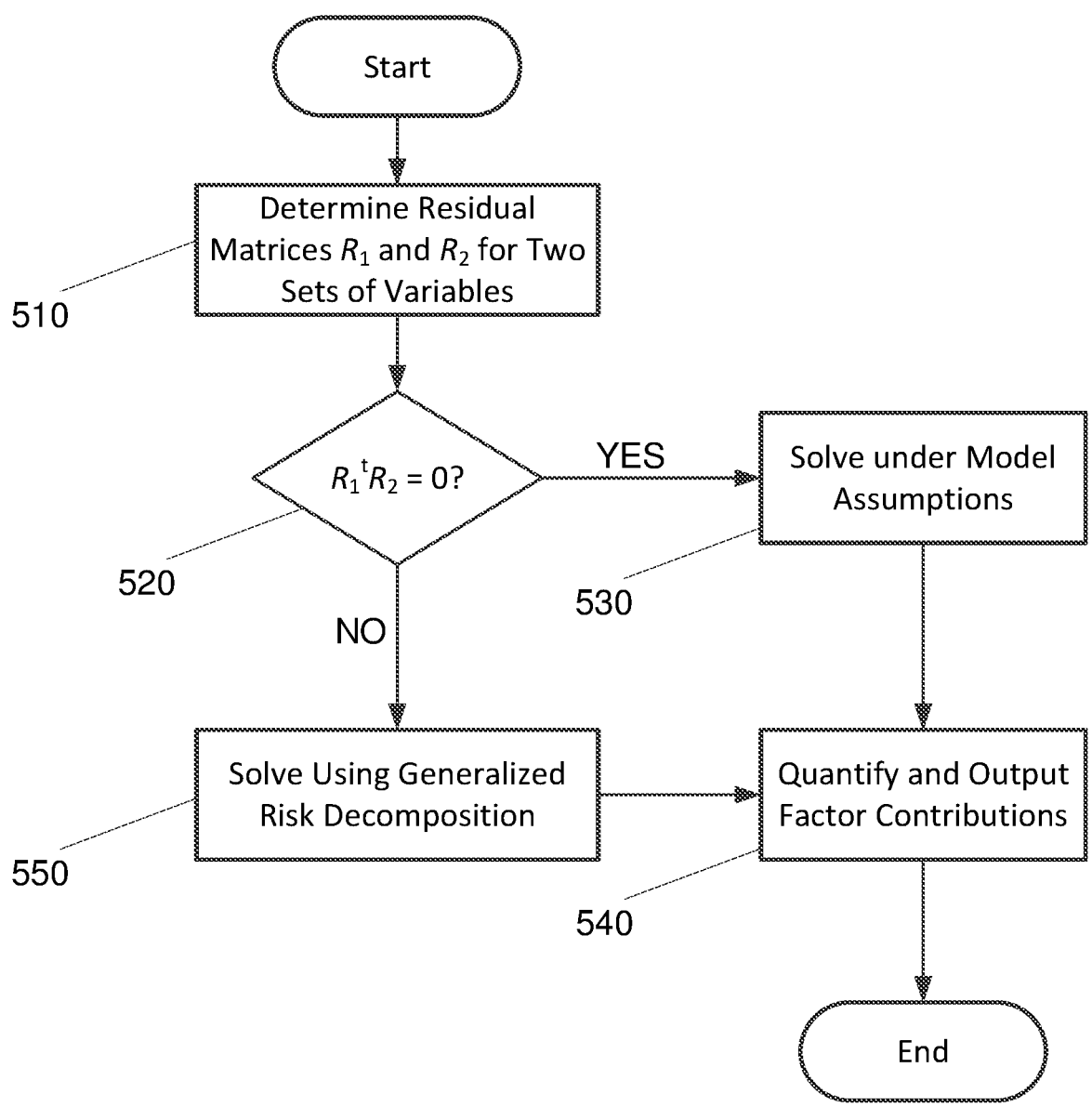
FIG. 5 is a flowchart illustrating a process for decorrelating effects in multiple linear regression to decompose and attribute risk to common and proper effects, according to an embodiment of the present invention.

FIG. 5 is a flowchart 500 illustrating a process for decorrelating effects in multiple linear regression to decompose and attribute risk to common and proper effects, according to an embodiment of the present invention. The process begins with determining residual matrices $R_1$ and $R_2$ that include a first residual part and a second residual part for a first set of risk factors and a second set of risk factors, respectively, at 510. If $R_1'R_2=0$ at 520 (i.e., the transpose of the residual matrix for the first set of factors multiplied by the residual matrix for the second set of factors), risk decomposition is performed in accordance with the model assumptions discussed above at 530 (i.e., orthogonality is enforced). More specifically, a three-way risk decomposition is performed enforcing orthogonality of the first residual part and the second residual part that also decomposes risk into a common part associated with a set of common hidden variables common to $R_1$ and $R_2$ that minimize a correlation between the first set of risk factors and the second set of risk factors, the common hidden variables modeled using a hidden factor model. This quantifies quantify how correlated the terms of the risk decomposition are. Contributions of each factor to the risk are then output at 540.

The decomposition can now be used to decompose the risk into three components, providing a risk value for each item. In addition, the contribution of each of the original explanatory variables to the common factors can be computed by calculating the norm of the projected variable onto the span of F divided by the norm of the variable. This can help explain the nature of the latent variables. A large ratio (i.e., a value close to unity) indicates that the variable is strongly associated with the latent variable, whereas a small ratio (i.e., a value close to zero) indicates that a particular variable is not contributing to or impacted by the latent variables.

However, if $R_1^T R_2$ is not equal to zero at 520, the projection method fails, and orthogonality cannot be enforced. As such, the generalized risk decomposition approach is employed at 550 without enforcing the orthogonality of the residuals. This approach involves selecting a small number for $\varepsilon$ and employing Algorithm D above to compute $C_1$ and $C_2$. The factor contributions are then quantified and output for the user to review at 540.

When $R_1'R_2=0$, in some embodiments, a maximum correlation is used between linear combinations of explanatory variables for each of the first set of risk factors and the second set of risk factors, given by:

$$\sup\left\{\frac{x_1'x_2}{\|x_1\|\|x_2\|} \,\bigg|\, x_1 \in X_1, x_2 \in X_2\right\}$$

where $X_1$ and $X_2$ are linear spaces spanned by columns of two design matrices $X_1$ and $X_2$ associated with the explanatory variables of the first set of risk factors and the second set of risk factors, respectively. The three-way risk decomposition may enforce orthogonality of $R_1$ and $R_2$ by setting a risk equal to $[f(X_1)C_1+f(X_2)\ C_2]+g(X_1)C_1+h(X_2)C_2$, where f, g, and h are functions that are constructed such that each of the terms $[f(X_1)C_1+f(X_2)C_2]$, $g(X_1)C_1$, and $h(X_2)C_2$ are uncorrelated.

When $R_1'R_2 \neq 0$, in some embodiments, a sufficiently small number $\varepsilon$ is selected such that correlation effects are minimized to a predetermined tolerance (e.g., $\varepsilon$ may be $10^{-3}$ or less) and contributions from each risk factor are then computed. In some embodiments, given $\varepsilon$, contributions to total risk is decomposed according to:

$$\gamma_1 = X_1\beta_1 = f_1 + r_1 \text{ and } \gamma_2 = X_2\beta_2 = f_2 + r_2$$

where $f_1'r_1 = f_2'r_2 = 0$ and $r_1'r_2 \leq \varepsilon \|r_1\|\|r_2\|$. The vectors $\gamma_1$ and $\gamma_2$ represent the decomposed risk from each of the sources. In certain embodiments, a squared norm of $r_1$, once a linear effect from $r_2$ is removed, is greater of equal to $(1-\varepsilon^2)\|r_1\|^2$. In some embodiments, $X_1$ and $X_2$ are design matrices of dimensions $n \times p_1$ and $n \times p_2$, respectively, with probabilities $p_1 + p_2 = p$ and both $p_1, p_2 \geq 2$. The contributions of each risk factor may be computed in some embodiments by: (1) setting $0 < \varepsilon < 1$ to a sufficiently small value such that correlation effects are minimized to a predetermined tolerance; (2) performing an eigen decomposition of projection matrices $P_1 = X_1(X_1'X_1)^{-1}X_1'$ and $P_2 = X_2(X_2'X_2)^{-1}X_2'$ to identify an orthonormal basis $U_{1*}$ and $U_{2*}$ for $\mathbb{X}_1$ and $\mathbb{X}_2$, a linear span of columns of design matrices $X_1$ and $X_2$, respectively; (3) performing an eigen decomposition of $Z_1 = U_{1*}'P_2U_{1*}$ and $Z_2 = U_{2*}'P_1U_{2*}$; (4) setting $I_1$ and $I_2$ to indices of the eigenvalues of $Z_1$ and $Z_2$, respectively, that are less than $\varepsilon^2$; (5) setting $Q_1 = \{U_{1*}w_{1j}: j \in I_1\}$, $Q_2 = \{U_{2*}w_{2j}: j \in I_2\}$; and (6) computing $C_1 = X_1 - Q_1Q_1'X_1$ and $C_2 = X_2 - Q_2Q_2'X_2$.

Figure 6:
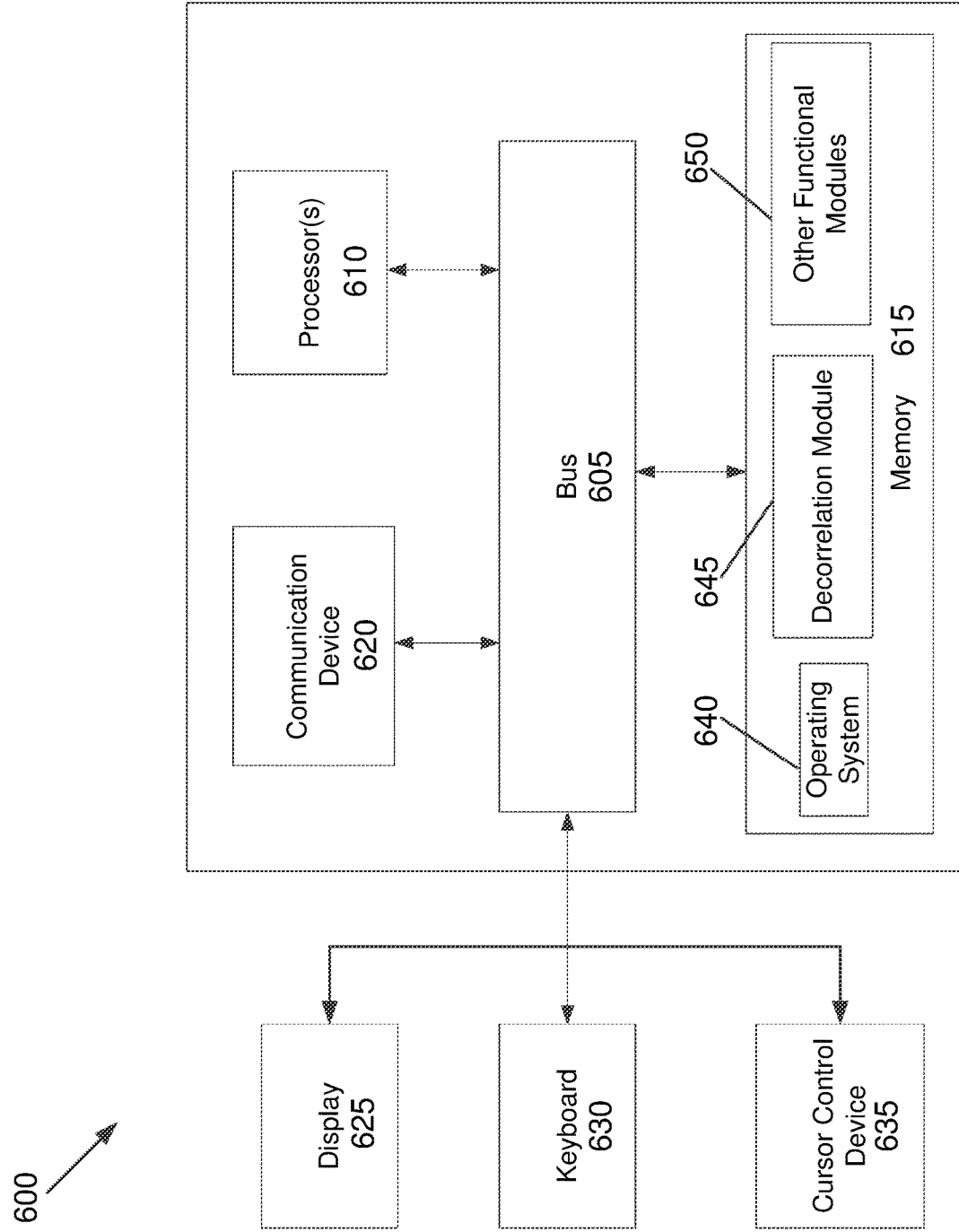
FIG. 6 is a block diagram illustrating a computing system configured to decorrelate effects in multiple linear regression to decompose and attribute risk to common and proper effects, according to an embodiment of the present invention.

FIG. 6 is a block diagram illustrating a computing system 600 configured to decorrelate effects in multiple linear regression to decompose and attribute risk to common and proper effects, according to an embodiment of the present invention. Computing system 600 includes a bus 605 or other communication mechanism for communicating information, and processor(s) 610 coupled to bus 605 for processing information. Processor(s) 610 may be any type of general or specific purpose processor, including a central processing unit (CPU) or application specific integrated circuit (ASIC). Processor(s) 610 may also have multiple processing cores, and at least some of the cores may be configured to perform specific functions. Multi-parallel processing may be used in some embodiments. Computing system 600 further includes a memory 615 for storing information and instructions to be executed by processor(s) 610. Memory 615 can be comprised of any combination of random access memory (RAM), read only memory (ROM), flash memory, cache, static storage such as a magnetic or optical disk, or any other types of non-transitory computer-readable media or combinations thereof. Additionally, computing system 600 includes a communication device 620, such as a transceiver and antenna, to wirelessly provide access to a communications network.

Non-transitory computer-readable media may be any available media that can be accessed by processor(s) 610 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 610 are further coupled via bus 605 to a display 625, such as a Liquid Crystal Display (LCD), for displaying information to a user. A keyboard 630 and a cursor control device 635, such as a computer mouse, are further coupled to bus 605 to enable a user to interface with computing system. However, in certain embodiments such as those for mobile computing implementations, a physical keyboard and mouse may not be present, and the user may interact with the device solely through display 625 and/or a touchpad (not shown). Any type and combination of input devices may be used as a matter of design choice.

Memory 615 stores software modules that provide functionality when executed by processor(s) 610. The modules include an operating system 640 for computing system 600. The modules further include a decorrelation module 645 that is configured to decorrelate effects in multiple linear regression to decompose and attribute risk to common and proper effects by employing any of the approaches discussed herein or derivatives thereof. Computing system 600 may include one or more additional functional modules 650 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 6 may be performed by a computer program, encoding instructions for the nonlinear adaptive processor to perform at least the process described in FIG. 6, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the process described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program for controlling an amount of unexplained correlation that remains in data after accounting for common hidden variables, the program embodied on a non-transitory computer-readable storage medium, the program configured to cause at least one processor to:
   determine residual matrices $R_1$ and $R_2$ comprising a first residual part and a second residual part for a first set of risk factors and a second set of risk factors, respectively;
   when $R_1'R_2=0$:
      perform a three-way risk decomposition approach enforcing orthogonality of the first residual part and the second residual part that also decomposes risk into a common part associated with a set of common hidden variables common to $R_1$ and $R_2$ that minimize a correlation between the first set of risk factors and the second set of risk factors, the common hidden variables modeled using a hidden factor model, and
      generate a computer-based data structure corresponding to linear vector spaces of unobserved latent variables, wherein the unobserved latent variables are represented as two matrices A and B whose inner-product $A^TB=0$;
   when $R_1'R_2 \neq 0$, perform a generalized risk decomposition approach without enforcing orthogonality of the first residual part and the second residual part;
   quantify how correlated the terms of the risk decomposition are based on the performed risk decomposition approach; and
   output the quantification, wherein
   a maximum correlation is used between linear combinations of explanatory variables for each of the first set of risk factors and the second set of risk factors, given by:

$$sup\left\{ \frac{x_1^t x_2}{\|x_1\|\|x_2\|} \,\bigg|\, x_1 \in X_1, x_2 \in X_2 \right\}$$

where $X_1$ and $X_2$ are linear spaces spanned by columns of two design matrices $X_1$ and $X_2$ associated with the explanatory variables of the first set of risk factors and the second set of risk factors, respectively.

2. The computer program of claim 1, wherein the generalized risk decomposition approach comprises:
   selecting a sufficiently small number ε such that correlation effects are minimized to a predetermined tolerance; and
   computing contributions from each risk factor.

3. The computer program of claim 2, wherein ε is $10^{-3}$ or less.

4. The computer program of claim 2, wherein given E, contributions to total risk is decomposed according to:

$$y_1 = X_1\beta_1 = f_1 + r_1 \text{ and } y_2 = X_2\beta_2 = f_2 + r_2$$

where $f_1'r_1 = f_2'r_2 = 0$ and $r_1'r_2 \leq \varepsilon\|r_1\|\|r_2\|$.

5. The computer program of claim 4, wherein a squared norm of $r_1$, once a linear effect from $r_2$ is removed, is greater of equal to $(1-\varepsilon^2)\|r_1\|^2$.

6. The computer program of claim 4, wherein $X_1$ and $X_2$ are design matrices of dimensions $n \times p_t$ and $n \times p_2$, respectively, with probabilities $p_t + p_2 = p$ and both $p_1, p_2 \geq 2$.

7. The computer program of claim 1, wherein when $R_1'R_2=0$, the three-way risk decomposition enforces orthogonality of $R_1$ and $R_2$ by setting a risk equal to $[f(X_1)C_1+f(X_2)C_2]+g(X_1)C_1+h(X_2)C_2$, where f, g, and h are functions that are constructed such that each of the terms $[f(X_1)C_1+f(X_2)C_2]$, $g(X_1)C_1$, and $h(X_2)C_2$ are uncorrelated.

8. The computer program of claim 1, wherein when $R_1'R_2 \neq 0$, contributions from each risk factor are computed by:
   setting $0 < \varepsilon < 1$ to a sufficiently small value such that correlation effects are minimized to a predetermined tolerance;
   performing an eigen decomposition of projection matrices $P_1 = (X_1'X_1)^{-1}X_1'$ and $P_2 = X_2(X_2'X_2)^{-1}X_2'$ to identify an orthonormal basis $U_{1*}$ and $U_{2*}$ for $\mathbb{X}_1$ and $\mathbb{X}_2$, a linear span of columns of design matrices $X_1$ and $X_2$, respectively;
   performing an eigen decomposition of $Z_1 = U_{1*}'P_2U_{1*}$ and $Z_2 = U_{2*}'P_1U_{2*}$;
   setting $I_1$ and $I_2$ to indices of the eigenvalues of $Z_1$ and $Z_2$, respectively, that are less than $\varepsilon^2$;
   setting $Q_1 = \{U_{1*}w_{1j}: j \in I_1\}$, $Q_2 = \{U_{2*}w_{2j}: j \in I_2\}$; and
   computing $C_1 = X_1 - Q_1Q_1'X_1$ and $C_2 = X_2 - Q_2Q_2'X_2$.

9. A computer-implemented method for controlling an amount of unexplained correlation that remains in data after accounting for common hidden variables, comprising:
   determining, by a computing system, residual matrices $R_1$ and $R_2$ comprising a first residual part and a second residual part for a first set of risk factors and a second set of risk factors, respectively;
   performing a three-way risk decomposition approach, by the computing system, enforcing orthogonality of the first residual part and the second residual part that also decomposes risk into a common part associated with a set of common hidden variables common to $R_1$ and $R_2$ that minimize a correlation between the first set of risk factors and the second set of risk factors, the common hidden variables modeled using a hidden factor model;
   generating, by the computing system, a computer-based data structure corresponding to linear vector spaces of unobserved latent variables, wherein the unobserved latent variables are represented as two matrices A and B whose inner-product $A^TB=0$;
   quantifying, by the computing system, how correlated the terms of the risk decomposition are based on the performed three-way risk decomposition approach; and
   outputting the quantification, by the computing system, wherein
   a maximum correlation is used between linear combinations of explanatory variables for each of the first set of risk factors and the second set of risk factors, given by:

$$\sup\left\{\frac{x_1^t x_2}{\|x_1\|\|x_2\|} \,\bigg|\, x_1 \in X_1, x_2 \in X_2\right\}$$

where $X_1$ and $X_2$ are linear spaces spanned by columns of two design matrices $X_1$ and $X_2$ associated with the explanatory variables of the first set of risk factors and the second set of risk factors, respectively.

10. The computer-implemented method of claim 9, wherein the three-way risk decomposition enforces orthogonality of $R_1$ and $R_2$ by setting a risk equal to $[f(X_1)C_1+f(X_2)C_2]+g(X_1)C_1+h(X_2)C_2$, where f, g, and h are functions that are constructed such that each of the terms $[f(X_1)C_1+f(X_2)C_2]$, $g(X_1)C_1$, and $h(X_2)C_2$ are uncorrelated.

11. The computer-implemented method of claim 9, wherein the method is performed when $R_1'R_2=0$.

12. A computer-implemented method for controlling an amount of unexplained correlation that remains in data after accounting for common hidden variables, comprising:
   determining, by a computing system, residual matrices $R_1$ and $R_2$ comprising a first residual part and a second residual part for a first set of risk factors and a second set of risk factors, respectively;
   performing a generalized risk decomposition approach, by the computing system, without enforcing orthogonality of the first residual part and the second residual part;
   generating, by the computing system, a computer-based data structure representing the generalized risk decomposition;
   quantifying, by the computing system, how correlated the terms of the risk decomposition are based on the performed generalized risk decomposition approach; and
   outputting the quantification as a data structure, by the computing system, wherein
   contributions from each risk factor are computed by:
      setting $0 < \varepsilon < 1$ to a sufficiently small value such that correlation effects are minimized to a predetermined tolerance, by the computing system;
      performing, by the computing system, an eigen decomposition of projection matrices $P_1 = (X_1'X_1)^{-1}X_1'$ and $P_2 = X_2(X_2'X_2)^{-1}X_2'$ to identify an orthonormal basis $U_{1*}$ and $U_{2*}$ for $\mathbb{X}_1$ and $\mathbb{X}_2$, a linear span of columns of design matrices $X_1$ and $X_2$, respectively;
      performing, by the computing system, an eigen decomposition of $Z_1 = U_{1*}'P_2U_{1*}$ and $Z_2 = U_{2*}'P_1U_{2*}$;
      setting $I_1$ and $I_2$ to indices of the eigenvalues of $Z_1$ and $Z_2$, respectively, that are less than $\varepsilon^2$, by the computing system;
      setting $Q_1 = \{U_{1*}w_{1j}: j \in I_1\}$, $Q_2 = \{U_{2*}w_{2j}: j \in I_2\}$, by the computing system; and
      computing $C_1 = X_1 - Q_1Q_1'X_1$ and $C_2 = X_2 - Q_2Q_2'X_2$, by the computing system.

13. The computer-implemented method of claim 12, wherein the generalized risk decomposition approach comprises:
   selecting a sufficiently small number $\varepsilon$ such that correlation effects are minimized to a predetermined tolerance, by the computing system; and
   computing contributions from each risk factor, by the computing system.

14. The computer-implemented method of claim 13, wherein $\varepsilon$ is $10^{-3}$ or less.

15. The computer-implemented method of claim 13, wherein given E,
   contributions to total risk is decomposed according to:

$$\gamma_1 = X_1\beta_1 = f_1 + r_1 \text{ and } \gamma_2 = X_2\beta_2 = f_2 + r_2$$

where $f_1'r_1 = f_2'r_2 = 0$ and $r_1'r_2 \leq \varepsilon \|r_1\|\|r_2\|$.

16. The computer-implemented method of claim 13, wherein a squared norm of $r_1$, once a linear effect from $r_2$ is removed, is greater of equal to $(1-\varepsilon^2)\|r_1\|^2$.

17. The computer-implemented method of claim 12, wherein the method is performed when $R_1{}^t R_2 \neq 0$.

* * * * *